United States Patent [19]

Murui et al.

[11] Patent Number: 5,584,055

[45] Date of Patent: *Dec. 10, 1996

[54] ADAPTER UNIT FOR ADAPTIVELY SUPPLYING A PORTABLE RADIO TELEPHONE WITH POWER

[75] Inventors: Kuniyoshi Murui, Saitama-ken; Goichi Sato, Tokyo; Takaaki Ishii, Kanagawa-ken; Shinji Takachi, Tokyo; Buntaro Sawa, Kanagawa-ken; Hiroshi Sato, Tokyo, all of Japan

[73] Assignee: Kabushiki Kaisha Toshiba, Japan

[*] Notice: The term of this patent shall not extend beyond the expiration date of Pat. No. 5,444,867.

[21] Appl. No.: 313,789

[22] Filed: Sep. 28, 1994

Related U.S. Application Data

[63] Continuation of Ser. No. 818,589, Jan. 9, 1992, Pat. No. 5,444,867.

[30] Foreign Application Priority Data

| Jan. 11, 1991 | [JP] | Japan | 3-002291 |
| Jan. 11, 1991 | [JP] | Japan | 3-002294 |
| Jan. 11, 1991 | [JP] | Japan | 3-002297 |
| Jan. 11, 1991 | [JP] | Japan | 3-002298 |
| Jan. 11, 1991 | [JP] | Japan | 3-002299 |

[51] Int. Cl.⁶ .................................................. H04B 1/38
[52] U.S. Cl. .................. 455/89; 455/90; 455/127; 455/343
[58] Field of Search ............... 455/89, 90, 127, 455/343; 379/58, 432, 446, 454

[56] References Cited

U.S. PATENT DOCUMENTS

| 4,091,318 | 5/1978 | Elchler et al. . |
| 4,558,178 | 12/1985 | Yasuda . |
| 4,627,107 | 12/1986 | Hohlfeld et al. ........................ 455/11.1 |
| 4,636,741 | 1/1987 | Mitzlaff ................................. 455/127 |
| 4,764,954 | 8/1988 | Tsurusaki et al. . |
| 4,835,484 | 5/1989 | Coulmance . |
| 4,852,147 | 6/1989 | Suzuki et al. . |
| 4,903,325 | 2/1990 | Yoshitake et al. . |
| 4,956,876 | 9/1990 | Koshiishi . |
| 4,977,609 | 12/1990 | McClure . |
| 5,003,109 | 7/1991 | Kawano et al. . |
| 5,036,532 | 7/1991 | Metroka et al. ......................... 455/89 |
| 5,046,131 | 9/1991 | Takahashi et al. ....................... 455/90 |
| 5,048,117 | 9/1991 | Aisaka et al. . |
| 5,054,115 | 10/1991 | Sawa et al. .............................. 455/89 |
| 5,150,031 | 9/1992 | James et al. . |
| 5,367,556 | 11/1994 | Marui et al. ............................. 455/89 |
| 5,444,867 | 8/1995 | Marui et al. ............................. 455/89 |

FOREIGN PATENT DOCUMENTS

| 0283853 | 9/1988 | European Pat. Off. . |
| 0310318 | 4/1989 | European Pat. Off. . |
| 0332825 | 9/1989 | European Pat. Off. . |
| 2727335 | 12/1978 | Germany . |
| 1-282930 | 11/1989 | Japan . |
| 2-57051 | 2/1990 | Japan . |
| 2-107029 | 4/1990 | Japan . |
| 82/02306 | 7/1982 | WIPO . |

*Primary Examiner*—Edward F. Urban
*Attorney, Agent, or Firm*—Banner & Allegretti, Ltd.

[57] ABSTRACT

An adapter unit for adaptively supplying a portable radio unit with electric power is disclosed. When the portable radio unit being not powered by a rechargeable battery attached thereto or being not in a communication state is connected to the adapter unit, the first power supply circuit of the adapter unit supplies the rechargeable battery or the portable radio unit with power. When the portable radio unit being in the communication state is connected to the adapter unit, the second power supply circuit of the adapter unit supplies the portable radio unit through the rechargeable battery with power. Power supply capacity of the second power supply circuit is larger than that of the first power supply circuit.

18 Claims, 7 Drawing Sheets

ADAPTER UNIT FOR ADAPTIVELY SUPPLYING A PORTABLE RADIO TELEPHONE WITH POWER

This application is a continuation of application Ser. No. 07/818,589, filed on Jan. 9, 1992, now U.S. Pat. No. 5,444,867.

BACKGROUND OF THE INVENTION

1. Field of Invention

This invention relates to the field of the radio telephone apparatus such as cellular radio telephones and cordless telephones and, more particularly, to an improved portable radio telephone apparatus couplable to an adapter unit.

2. Description Of The Relevant Art

As cellular radio telephones come into wide use, various types of vehicle adapters for the radio telephone have been developed. For example, U.S. Pat. No. 5,048,117 to Aisaka et al. discloses an adaptor unit which may amplify radio frequency signals output from a portable radio telephone in response to a level control signal. As another example of the vehicle adaptor, commonly assigned U. S. Pat. No. 5,045,115 to Salva et al. discloses a radio telephone apparatus wherein a portable radio device may be connected to an additional unit having a speaker and a microphone via a cable, so that hand-free operations becomes available to the user of the apparatus when they are connected.

According to such conventional adapters, however, two power supply Lines are required to be included in a connection cable between the portable radio telephone and the adaptor unit: one for charging the battery of the portable radio telephone and the other one for supplying the portable radio telephone with electric power. When this power supply-using two lines is used, the circuit arrangement of the portable radio telephone becomes so complicated that the cost in manufacturing the radio telephone increases.

SUMMARY OF THE INVENTION

Accordingly, it is an object of the present invention to provide an improved radio telephone apparatus having a portable radio unit with a battery and an adaptor unit, which reduces power consumption by controlling the power supplied to the portable radio unit or the battery.

It is another object of the present invention to provide an improved radio telephone apparatus having a portable radio unit and an adaptor unit, wherein, only one power supply line is needed for supplying the portable radio telephone with electric power.

It is still another object of the present invention to provide an improved radio telephone apparatus having a portable radio unit and an adaptor unit, wherein the cost in manufacturing the radio telephone apparatus is reduced.

In accordance with the present invention, an adapter unit used with a portable radio unit having a rechargeable battery which is couplable to the adapter unit, comprises first power supply circuits for charging the rechargeable battery with electric power in the event that the portable radio unit being not powered by the rechargeable battery is connected to the adapter unit and second power supply circuits for supplying the portable radio unit with electric power in the event that the portable radio unit being powered by the rechargeable battery and in a communication state is attached to the adapter unit. The power supply capacity of the second power supply circuits is larger than that of the first power supply circuits. Thereby, since the power is supplied to the portable radio unit or the adaptor in accordance with the operational state of the portable radio unit, power consumption may be reduced.

The second power supply circuits may supply the portable radio unit with electric power through the rechargeable battery. The adapter unit comprises a power supply terminal connected to both of the first power supply circuits and the second power supply circuits for supplying the portable radio unit or the rechargeable battery with electric power. Thereby, only one power supply line is needed for supplying the portable radio telephone with electric power. Also, the cost in manufacturing the radio telephone apparatus may be reduced.

In accordance with another aspect of the present invention, an adapter unit, used with a portable radio unit having a rechargeable battery which is couplable to the adapter unit, comprises first power supply circuits for charging the rechargeable battery with electric power in the event that the portable radio unit being not in a communication state is connected to the adapter unit and second power supply circuits for supplying the portable radio unit with electric power in the event that the portable radio unit being powered by the rechargeable battery and in a communication state is attached to the adapter unit. The power supply capacity of the second power supply circuits is larger than that of the first power supply circuits. Thereby, since the amount of power supplied to the portable radio unit or the adapter depends on whether the portable radio unit is in the communication state, power consumption may be reduced.

BRIEF DESCRIPTION OF THE DRAWINGS

A more complete appreciation of the present invention and many of the attendant advantages thereof will be readily obtained as the present invention becomes better understood by reference to the following detailed description when considered in connection with the accompanying drawings.

DETAILED DESCRIPTION OF THE PREFERRED EMBODIMENTS

The present invention will be described in detail with reference to the accompanying drawings.

Figure 1:
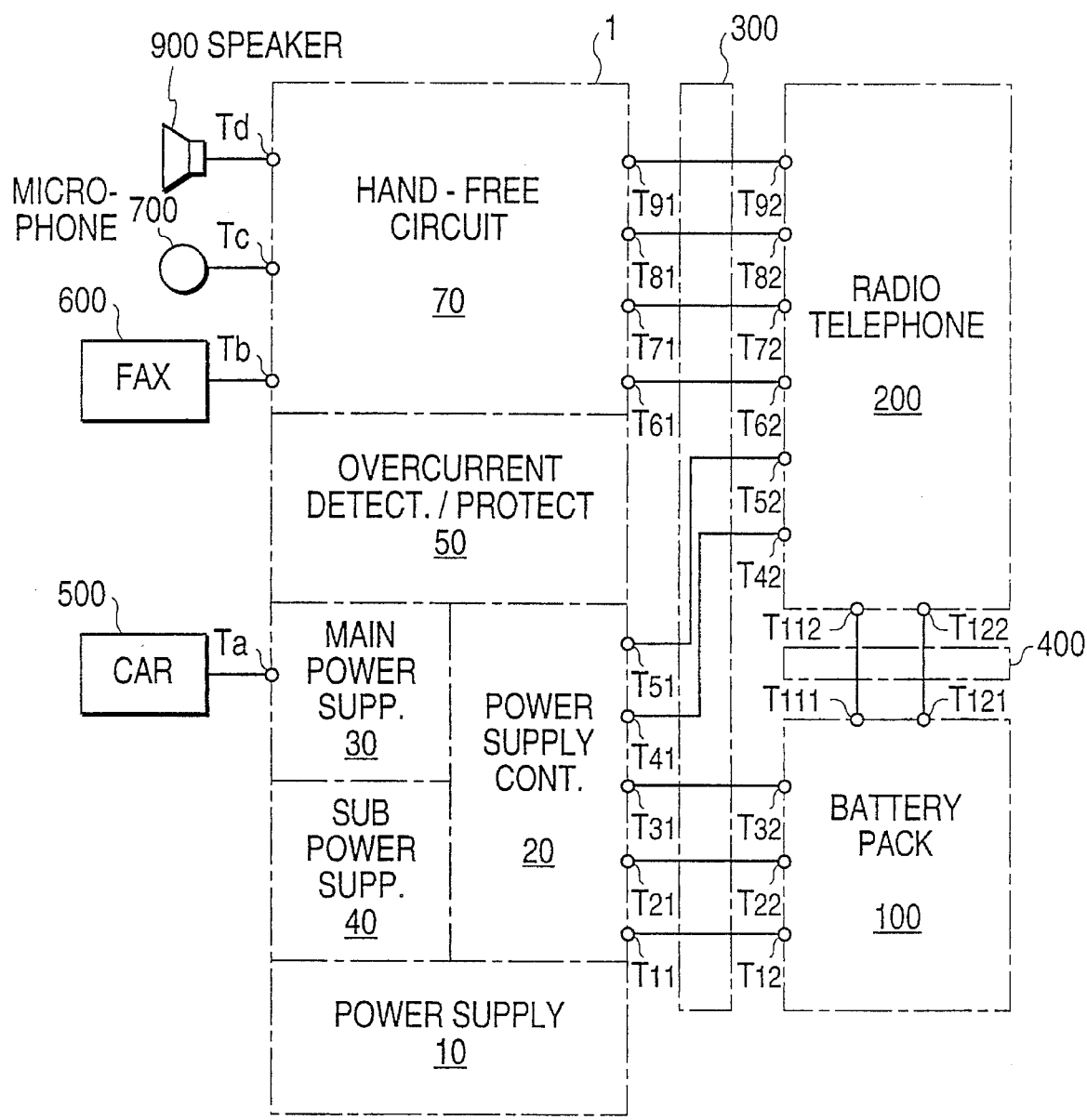
FIG. 1 is a block diagram showing an embodiment of an adapter for radio telephone equipment according to the present invention.

FIG. 1 shows the overall arrangement of a cellular portable telephone according to an embodiment of the present invention. The radio telephone comprises an adapter 1, a portable radio telephone 200, and a battery pack 100. The portable radio telephone 200 and the battery pack 100 are detachably connected to the adapter 1 through a contact-type connector 300. The battery pack 100 is detachably connected to the radio telephone 200 through a connector 400.

The adapter 1 comprises a power supply section 10 for a handfree circuit section, a power supply control circuit section 20, a main power supply circuit section 30, a sub-power supply circuit section 40, an overcurrent detection/protection circuit section 50, and a hand-free circuit section 70. The power supply section 10 supplies the hand-free circuit section 70 with electric power, and the power supply control circuit section 20 controls the main power supply circuit section 30 and the sub-power supply circuit section 40. The main power supply circuit section 30 is connected, for example, to a car-mounted battery 500 at a terminal $T_a$ to supply power to both the portable radio telephone 200 and battery pack 100 when the portable radio telephone 200 having established a radio link is connected to the adapter 1. The sub-power supply circuit section 40 supplies power for charging the battery pack 100 when the portable radio telephone 200 in its non-operating or reception-waiting state is connected to the adapter. The handfree circuit section 70 is connected to a speaker 900 at a terminal $T_d$ and to a microphone 700 at a terminal $T_c$ to enable a call using the speaker 900 and microphone 700 when the radio telephone is connected to the adapter 1. Further, the hand-free circuit section 70 may be connected at a terminal $T_b$ to a data terminal such as a facsimile apparatus 600, and data communication can be performed using the data terminal. The adaptor 1 may be mounted near the driver's seat in a car.

The contact-type connector 300 includes, for example, nine pins to connect terminals T11, T21 and T31 of the power supply control circuit section 20 with terminals T12, T22 and T32 of the battery pack 100, respectively, and to connect terminals T41 and T51 of the power supply control circuit section 20 and terminals T61, T71, T81 and T91 of the hand-free circuit section 70 with terminals T42, T52, T62, T72, T82 and T92 of the portable radio telephone 200, respectively. The connector 400 includes two pins to connect terminals T111 and T121 of the battery pack 100 with terminals T112 and T122 of the portable radio telephone 200.

Figure 2:
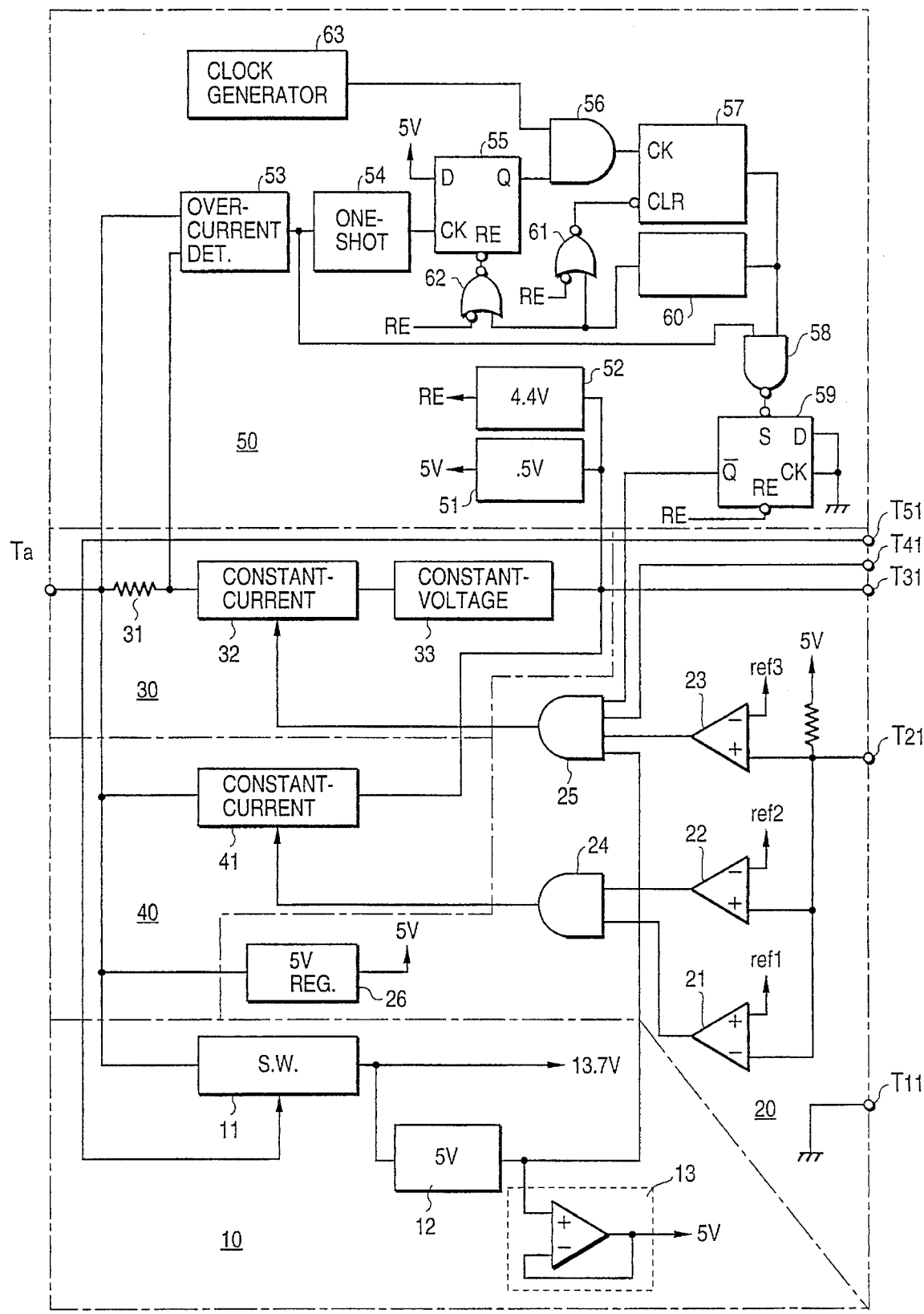
FIG. 2 is a block diagram showing in detail a power supply section for a hand-free circuit, a power supply control circuit section, a main power supply circuit section, a sub-power supply circuit section, and an overcurrent detection/protection circuit section of the adapter according to the embodiment shown in FIG. 1.
Figure 3:
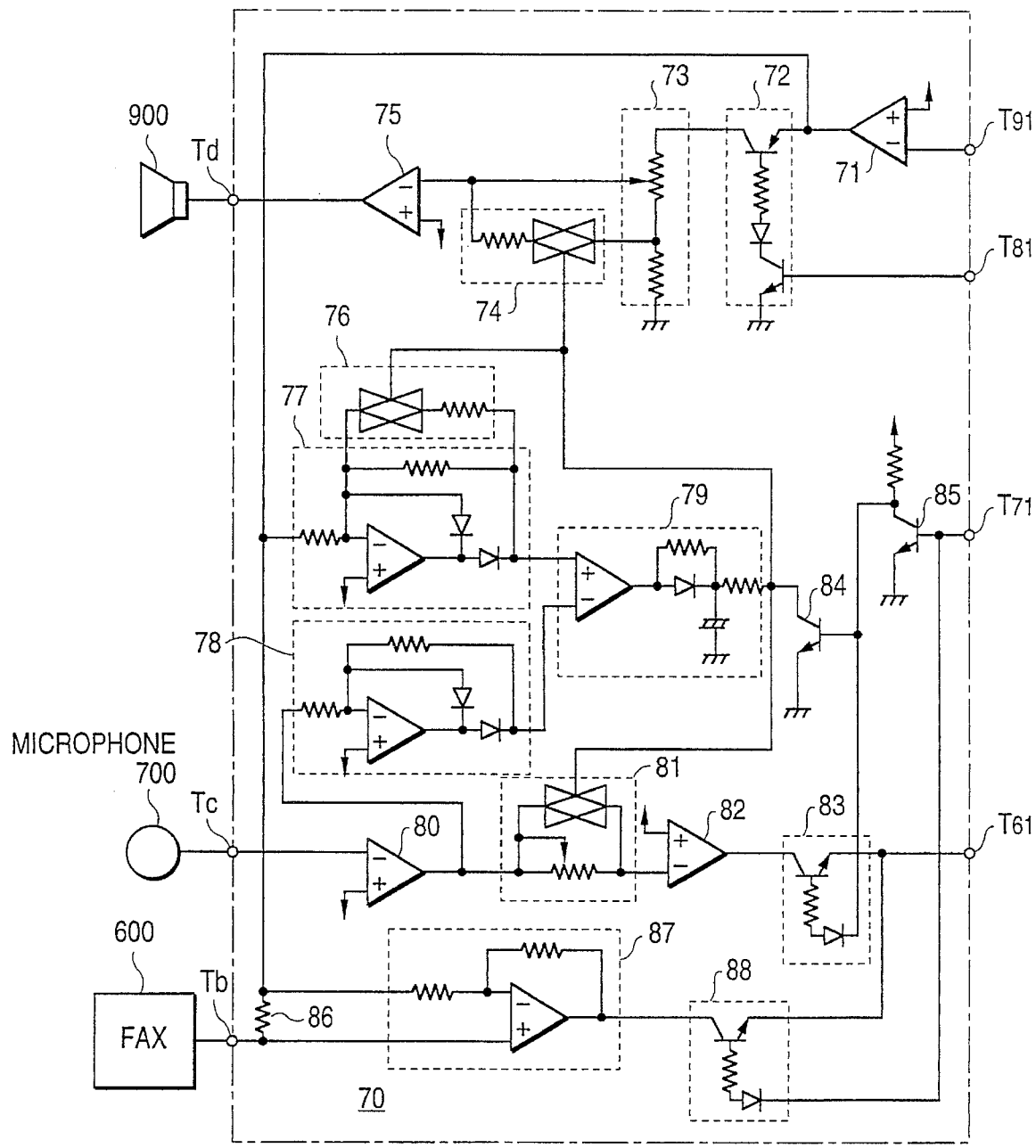
FIG. 3 is a block diagram showing in detail a hand-free circuit section of the adapter according to the embodiment shown in FIG. 1.
Figure 4:
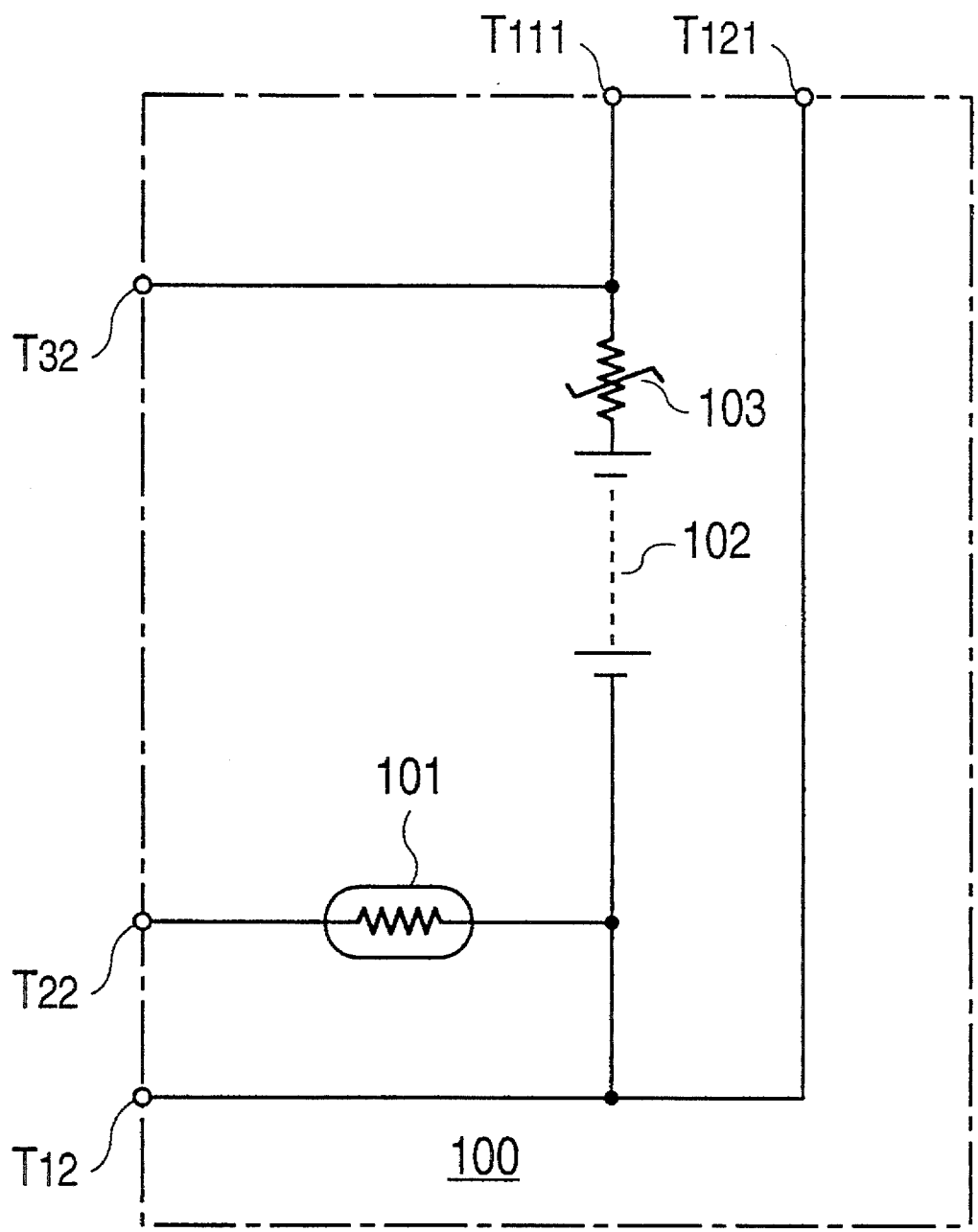
FIG. 4 is a circuit diagram showing in detail a battery pack of the adapter according to the embodiment shown in FIG. 1.
Figure 5:
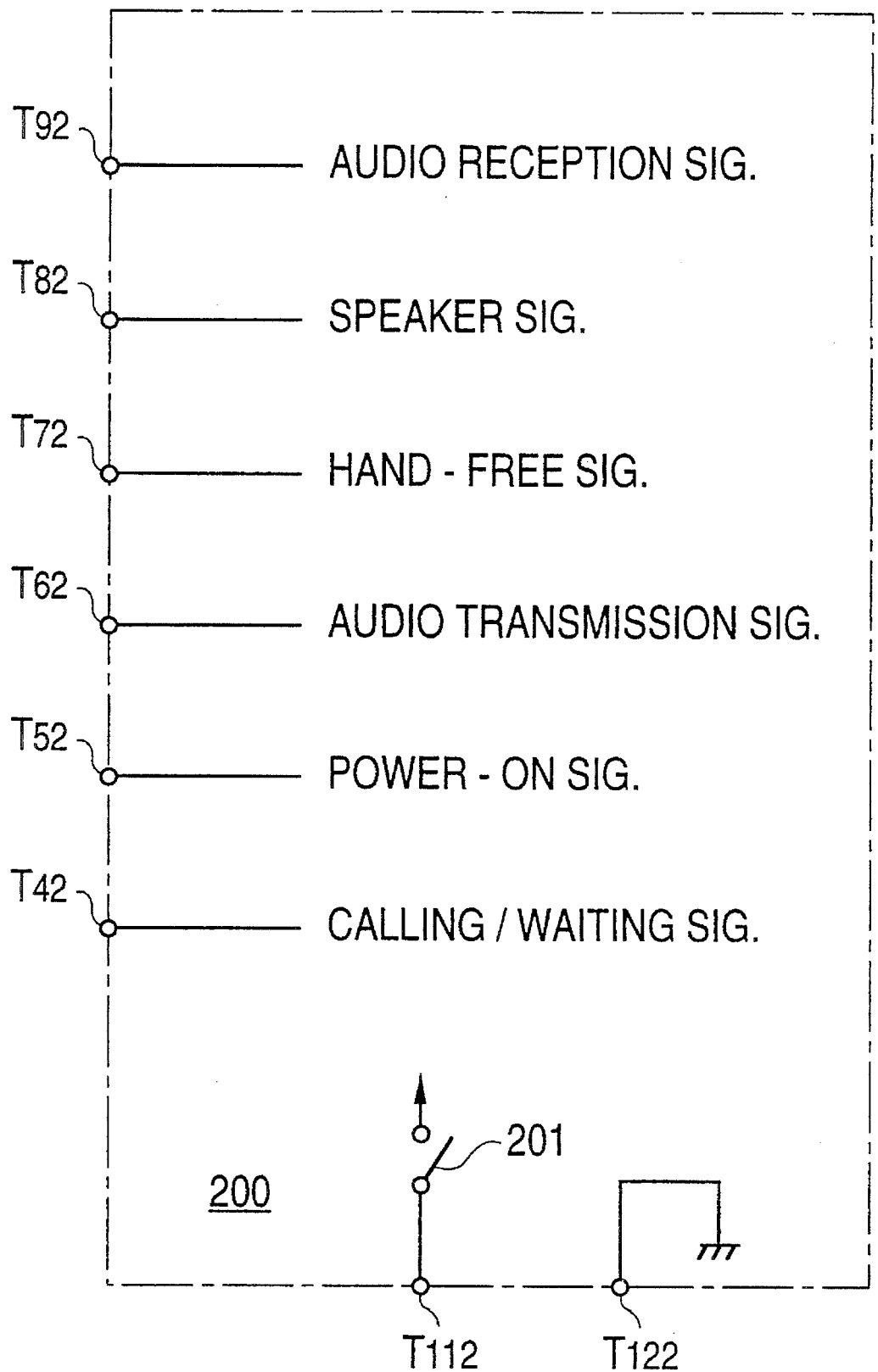
FIG. 5 shows a terminal signal of a portable radio telephone of the adapter according to the embodiment shown in FIG. 1.

FIG. 2 shows the interconnection of the power supply section 10 for the hand-free circuit section, power supply control circuit section 20, main power supply circuit section 30, sub-power supply circuit section 40, and overcurrent detection/protection circuit section 50. FIG. 3 shows the interconnection of the hand-free circuit section 70. FIG. 4 shows an arrangement of the battery pack 100. FIG. 5 shows various signals supplied to the terminals of the portable radio telephone 200.

The operations of the power supply section 10, power supply control circuit section 20, main power supply circuit section 40, and overcurrent detection/protection circuit section 50 will be described in detail with reference to FIG. 2.

Since the operations of the power supply section 10, power supply control circuit section 20, main power supply circuit section 30, sub-power supply circuit section 40 and overcurrent detection/ protection circuit section 50 depend upon the operating state of the portable radio telephone 200, they will be described for each of the following three modes.

1. In the event that the portable radio telephone 200 of which power switch is turned off is connected to the adapter 1, the operations of the above sections depend upon whether the temperature of the battery pack 100 falls within a range of temperatures at which a battery 102 (shown in FIG. 4) of the battery pack 100 can be charged. The range of temperatures may be 0° to 45°C. However, the invention is not limited in this respect.

Temperature T of the battery pack 100 is detected by a thermistor 101 (shown in FIG. 4) of the battery pack 100, and information representing the temperature T is supplied to the terminal T21 of the power supply control circuit section 20 through the contact-type connector 100. The information supplied to the terminal T21 is converted into a voltage signal corresponding to the detected temperature T of the battery pack 100, and then transmitted to both a minus terminal of a comparator 21 and plus terminals of comparators 22 and 23.

Assuming a range of 0° to 45° C. as an example, the comparator 21 outputs a high-level signal when a reference voltage ref1 corresponding to 0 °C. is applied to its plus terminal and the voltage signal corresponding to the detected temperature T of the battery pack 100 is at a temperature 0 or more degrees C. The comparator 21 outputs a low-level signal when the detected temperature T represented by the voltage signal is at the other temperatures (T<0).

The comparator 22 outputs a high-level signal when a reference voltage ref2 corresponding to 45° C. is applied to it plus terminal and the voltage signal corresponding to the detected temperature T of the battery pack 100 is at a temperature of 45° C. or less. The comparator 22 outputs a low-level signal when the detected temperature T represented by the voltage signal is at the other temperatures (T>45°C.).

The comparator 23 outputs a high-level signal when a reference voltage ref3 corresponding to the maximum usable temperature, 60° C. for example, is applied to its plus terminal and the voltage signal corresponding to the detected temperature T of the battery pack 100 is at a temperature of 60 degree or less. The comparator 23 outputs a low-level signal when the detected temperature T represented by the voltage signal is at the other temperatures (T>60° C.).

Assuming that the detected temperature T of the battery pack 100 is 0 T≦45, the signals output from the comparators 21 and 22 are both high in level, AND conditions of an AND circuit 24 are satisfied, and the AND circuit 24 outputs a high-level signal. The high-level signal is supplied to a constant-current circuit 41 of the sub-power supply circuit section 40 to turn on the circuit 41. The current of the constant-current circuit 41 is limited to a value, e.g., 120 mA, enough to charge the battery 102 of the battery pack 100. The output current of the constant-current circuit 41 is supplied to the battery 102 through the terminal T31, contact-type connector 300, terminal T32 of the battery pack 100, and current limiting resistor 103, thereby charging the battery 102.

In this state, since a power switch 201 (shown in FIG. 5) of the portable radio telephone 200 is turned off, a power-on signal output from the terminal T52 of the portable radio telephone 200 is low in level. This low-level signal is thus supplied to the control terminal of the power supply section 10 via the terminal T52, contact-type connector 300, and terminal T51. Accordingly, the switch 11 of the power supply section 10 is turned off. Since, therefore, power is not supplied to the hand-free circuit section 70, the hand-free circuit section 70 is rendered inoperative. Since the output signal of a 5 V regulator 12 which is supplied with the output signal of the switch 11 is low in level, the AND conditions of the AND circuit 25 supplied with the low-level signal are not satisfied, the output signal of the AND circuit 28 is low in level, and a constant-current circuit 32 of the main power supply circuit section 30 supplied with the output signal of the AND circuit 25 is turned off.

When the detected temperature T of the battery pack 100 is less than 0°C., that is, when T<0, an output signal of the comparator 21 is low in level and, in this case, the AND conditions of the AND circuit 24 are not satisfied. Therefore, an output signal of the AND circuit 24 is low in level, the constant-current circuit 41 of the sub-power supply circuit section 40 is turned off, and no charging current is supplied to the battery 102 of the battery pack 100.

When the detected temperature T of the battery pack 100 exceeds 45°C., that is, when T>45 degree, an output signal of the comparator 22 is low in level and, in this case, the AND conditions of the AND circuit 24 are not satisfied. Therefore, an output signal of the AND circuit 24 is low in level. As a result, the constant-current circuit 41 of the sub-power supply circuit section 40 is turned off. No charging current is thus supplied to the battery 102 of the battery pack 100.

2. In the event that the portable radio telephone 200 which is turned off is connected to the adapter 1, if a power switch 201 (shown in FIG. 5) of the portable radio telephone 200 is turned on, a power-on signal output from the terminal T52 of the portable radio telephone 200 becomes high in level. This high-level signal is supplied to the control terminal of the switch 11 of the power supply section 10 through the terminal T52, contact-type connector 300, and terminal T51. The switch 11 of the power supply section 10 is thus turned on.

If the switch 11 of the power supply section 10 is turned on, a power supply voltage of 13.7 V is applied to the hand-free circuit section 70, and a power supply voltage of 5 V, which is generated by smoothing the output of the 5V regulator 12 by a ripple filter, is applied to the hand-free circuit section 70. The hand-free circuit section is thus rendered operative. The operation of the hand-free circuit section 70 will be described in detail later.

Since the portable radio telephone 200 is in the wait state, a calling/waiting signal output from the terminal T42 of the portable radio telephone 200 is low in level. This low-level signal is supplied to the AND circuit 25 through the contact-type connector 300 and terminal T41, so that the AND conditions of the AND circuit 25 are not satisfied, an output signal of the AND circuit 25 is low in level, and the constant-current circuit 32 of the main power supply circuit section 30 is turned off.

If the detected temperature T of the battery pack 100 ranges from 0° to 45°C.(0≦T≦45), both the output signals of the comparators 21 and 22 become high in level, the AND conditions of the AND circuit are satisfied, the constant-current circuit 41 of the sub-power supply circuit section 40 is turned on, and the battery 102 of the battery pack 100 is charged with the output current of the constant-current circuit 41.

When the detected temperature T of the battery pack 100 is less than 0°C., that is, when T<0, an output signal of the comparator 21 becomes low in level. Therefore, the AND conditions of the AND circuit 24 are not satisfied, the constant-current circuit 41 of the sub-power supply circuit section 40 is turned off, and the battery 102 of the battery pack 100 is not supplied with charging current. When the detected temperature T of the battery pack 100 exceeds 45°C., that is, when T>45° C. an output signal of the comparator 22 becomes low in level and, in this case, the AND conditions of the AND circuit 24 are not satisfied, the constant-current circuit 41 of the sub-power supply circuit section 40 is turned off, and the battery 102 of the battery pack 100 is not supplied with charging current. This operation is the same as that of the case where the power switch 201 of the portable radio telephone 200 is turned off and the portable radio telephone 200 is connected to the adapter 1.

3. In the event that the power switch of the portable radio telephone 200 has been turned on, a speech radio link is established, and the portable radio telephone is connected to the adapter 1, a calling/waiting signal supplied to the terminal T42 of the portable radio telephone 200 becomes high in level. This high-level signal is supplied to the AND circuit 25 through the contact-type connector 300 and terminal T42.

If the detected temperature T of the battery pack 100 is not more than 60°C., and falls within a range capable of using the radio telephone, an output signal of the comparator 23 is high in level, and this high-level signal is supplied to the AND circuit 25.

Since the power switch 201 (shown in FIG. 5) of the portable radio telephone 200 is then turned on, a power-on signal output from the terminal T52 of the portable radio telephone 200 is high in level, the switch 11 of the power supply section 10 is turned on, and an output signal of the 5V regulator 12 is high in level. This high-level signal is also supplied to the AND circuit 25.

Further, an inverted signal output from a flip-flop circuit 59 of the hand-free circuit section 70, which will be described in detail, is high in level. This high-level signal is also supplied to the AND circuit 25.

Consequently, all of the signals supplied to the AND circuit 25 are high in level and, in this case, the AND conditions of the AND circuit 25 are satisfied and a high-level signal is output from the AND circuit 25. This high-level signal is supplied to the control terminal of the constant-current circuit 32 of the main power supply circuit section 30 and accordingly the constant-current circuit 32 of the main power supply circuit section 30 is turned on.

The output of the constant-current circuit 32 of the main power supply circuit section 30 is adjusted to have a predetermined voltage in the constant-voltage circuit 33, and the voltage is applied to the terminal T31, contact-type connector 300, and terminal T32 of the battery pack 100.

A method for supplying power from the adapter 1 to the portable radio telephone 200 in this embodiment will be described. In this embodiment, the power from the adapter 1 is supplied to the portable radio telephone 200 via the battery pack 100.

In the event that the power switch 201 of the portable radio telephone 200 is turned off and the portable radio telephone 200 is mounted on the adapter 1, as described above, only the constant-current circuit 41 of the sub-power supply circuit section 40 is turned on, and the battery 102 of the battery pack 100 is charged with constant current of 120 mA supplied from the constant-current circuit 41.

When the portable radio telephone 200 in its wait state is mounted on the adapter 1, only the constant-current circuit 41 of the sub-power supply circuit section 40 is turned on, the portable radio telephone 200 receives, through the battery pack 100, a current necessary for operations of the portable radio telephone 200 in the wait state of about 120 mA output from the constant-current circuit 41, and the other current flows into the battery 102 of the battery pack 100 as a charging current. The current necessary for operations of the portable radio telephone 200 in the wait state is switched from the current supplied by the battery 102 of the battery pack 100 to the current from the constant-current circuit 41 of the sub-power supply circuit section 40 of the adapter 1. When the portable radio telephone 200 in the wait state is mounted on the adapter 1, the switch 11 of the power supply section 10 is turned on, and the hand-free circuit section 70 is rendered operative.

If the portable radio telephone 200 is detached from the adapter 1 in this state, the current supplied to the portable radio telephone 200 in the wait state is switched from the current supplied by the constant-current circuit 41 of the sub-power supply circuit section 40 of the adapter 1 to the current from the battery 102 of the battery pack 100. Further, the switch 11 of the power supply section 10 is then turned off, and the hand-free circuit section 70 is rendered inoperative.

In the event that the portable radio telephone 200 which has been turned on and has established a speech radio link is mounted on the adapter 1, the constant-current circuit 32 of the main power supply circuit section 30 of the adapter 1, the constant-current circuit 41 of the sub-power supply circuit section 40, and the switch 11 of the power supply section 10 are all turned on. The portable radio telephone 200 is supplied with power from the constant-voltage circuit 33 of the main power supply circuit section 30 and from the constant-current circuit 41 of the sub-power circuit section 40 through the battery pack 100. The hand-free circuit section 70 is supplied with power from the power supply section 10. The power supplied to the portable radio telephone 200 is switched from the power supplied by the battery 102 of the battery pack 100 to the power from the constant voltage circuit 33 of the main power supply circuit section 30 of the adapter 1 and the constant-current circuit 41 of the sub-power supply circuit section 40.

If the portable radio telephone 200 is disconnected from the adapter 1 in this state, the power supplied to the portable radio telephone 200 is switched from the power supplied by the constant-voltage circuit 33 of the main power supply circuit section 30 of the adapter 1 and the constant-current circuit 41 of the sub-power supply circuit section 40 to the-power from the battery 102 of the battery pack 100. The switch 11 of the power supply section 10 is then turned off, and the hand-free circuit section 70 is rendered inoperative.

Consequently, the portable radio telephone 200 can freely be attached to and detached from the adapter 1, irrespective of the operational state of the portable radio telephone 200.

Next, the operation of the overcurrent detection/protection circuit 50 will be described.

The overcurrent detection/protection circuit 50 performs the following functions when the portable radio telephone 200 is in a communication state.

a. The circuit 50 detects an abnormal amount of charging current due to the internal short circuit in the battery pack 100 mounted on the portable radio telephone 200.

b The circuit 50 starts an abnormality monitoring timer after detecting the abnormal amount of current.

c. If the abnormal amount of current flows when the abnormality monitoring timer stops, the constant-current circuit 32 of the main power supply circuit section 30 is turned off.

The operation of the overcurrent detection/protection circuit 50 will be described when the portable radio telephone 200 in the communication state is mounted on the adapter 1. If the portable radio telephone 200 is mounted on the adapter 1, the constant-current circuit 32 of the main power supply circuit section 30 is turned on, as described above. 5 V power is supplied to each section of the overcurrent detection/protection circuit 50 through the 5V regulator 51. A reset signal RE is supplied from a 4.4 V detection circuit 52 to each section of the overcurrent detection/protection circuit 50. The 4.4 V detection circuit 52 detects that an output of the off constant-voltage circuit 33 of the main power supply circuit section 30 decreases down to 4.4 V, and generates the reset signal RE which falls from high level to low level. Flip-flops 55 and 59 of the overcurrent detection/protection circuit 50 are reset by the fall of the reset signal RE, and a timer 57 is cleared by the fall of the reset signal RE.

If the charging current of the battery pack 100 abnormally increases, this increase is detected by an overcurrent detection circuit 53 for monitoring a voltage at both ends of a resistor 31 arranged before the constant-current circuit 32 of the main power supply circuit section 30. The overcurrent detection circuit 53 normally outputs a low-level signal, but outputs a high-level signal when it detects overcurrent. When the output signal of the overcurrent detection circuit 53 rises from low level to high level, a one-shot circuit 54 is triggered in synchronization with this rise and generates a one-shot pulse. Since the flip-flop 55 is reset in the initial state, a set output Q of the flip-flop 55 is low in level, an AND circuit 56 is rendered inoperative, and a clock signal from a clock generator 63 is not supplied to a clock terminal CK of the timer 57. If the flip-flop 55 is set in response to the one-shot pulse from the one-shot circuit 54, the set output Q of the flip-flop becomes high in level. The AND circuit 56 is thus rendered operable, and the clock signal generated from the clock generator 63 is supplied to the clock terminal CK of the timer 57. The timer 57, therefore, starts to operate. When the timer 57 stops, it outputs a high-level signal, and this high-level signal is supplied to an AND circuit 58. An output of the overcurrent detection circuit 53 is added to the other inputs of the AND circuit 58. If the overcurrent detection circuit 53 still detects overcurrent, the AND conditions of the AND circuit 58 are satisfied. The flip-flop 59 is thus set, and an inverted signal output from the flip-flop 59 falls from high level to low level. The AND circuit 25 of the power control circuit section 20 is rendered inoperative, an output of the AND circuit 25 changes from high level to low level, and the constant-current circuit 32 of the main power supply circuit section 30 is turned off.

If an output of the overcurrent detection circuit 53 falls to a low level when the timer 57 stops, the AND conditions of the AND circuit 58 are not satisfied and the flip-flop 59 is not set.

Therefore, an output of the AND circuit 25 of the power control circuit section 20 remains high in level, and the constant-current circuit 32 of the main power circuit section 30 is not turned off.

When the timer 57 stops, the one-shot circuit 60 is triggered by the fall of the high-level signal output from the timer 57, and the timer 57 is cleared by the one-shot pulse generated from the one-shot circuit 60 through an OR circuit 61, or the flip-flop 55 is reset through an OR circuit 62, thereby preparing against the next overcurrent. After that, even though the portable radio telephone 200 is detached from the adapter 1, the above operation is repeated if the portable radio telephone 200 is mounted on the adapter 1 again, as long as the communication state continues.

If the portable radio telephone 200 is mounted on the adapter 1 when the portable radio telephone 200 is in the wait state or when the power switch 201 is turned off, the constant-current circuit 32 of the main power supply circuit section 30 is not turned on and accordingly the overcurrent detection/protection circuit 50 does not operate.

The operation of the hand-free circuit section 70 will be described in detail, mainly referring to FIG. 3.

Terminals T61, T71, T81 and T91 of the hand-free circuit section 70 are connected to terminals T62, T72, T82 and T92 of the portable radio telephone 200 through the contact-type connector 300, respectively. An audio reception signal supplied from the portable radio telephone 200 to the handfree circuit section 70 appears at the terminal T92 of the portable radio telephone 200, and an audio transmission signal supplied from the hand-free circuit section 70 to the portable radio telephone 200 appears at the terminal T61 of the hand-free circuit section 70. Furthermore, a speaker signal, which is at a high level in a conversation mode for normal conversation and at a low level in a data transmission mode for data communication, such as facsimile communication, appears at the terminal T82 of the portable radio telephone 200, and a hand-free signal, which is at a high level when hand-free calling is selected and at a low level when it is not selected, appears at the terminal T72 thereof.

The case where the hand-free calling is selected, the high-level hand-free signal is generated at the terminal T72 of the portable radio telephone 200, and the high-level speaker signal representing the conversation mode is generated at the terminal T82, will be described.

A speaker pass switch 72 is turned on in response to the high-level speaker signal generated at the terminal T81, and a data communicating switch 88 is turned off in response to the high-level hand-free signal generated at the terminal T72. A transistor 85 is turned on and a transistor 84 is turned off, in response to the high-level hand-free-signal. A speech switch 83 is turned on when the transistor 85 is turned on.

If the audio reception signal is generated at the terminal T92 of the portable radio telephone 200 and supplied to the T91 of the hand-free circuit section 70 through the contact-type connector 300, the audio reception signal is amplified to a predetermined level by an amplifier 71, and supplied to a volume circuit 73 through the speaker pass switch circuit 72. As is evident from the following description, an output of a reception/transmission level comparing circuit 79 is high in level, a reception insertion loss changing switch 74 is turned on, and an output of the volume circuit 73 is greatly attenuated and supplied to a power amplifier 75. Therefore, the volume of a hand-free speaker to which an output of the power amplifier 75 is supplied through terminal Td is decreased to such an extent that the bidirectional characteristics of conversation cannot be degraded.

The output of the amplifier 71 is partially supplied to an amplification rectifying circuit 77 as a reception monitor signal. The signal is amplification-rectified and input to a plus terminal of the reception/transmission level comparator 79. The amplification rectifying circuit 77 is biased so that an input voltage of the comparator 79 becomes higher at the plus terminal when neither an audio reception signal nor an audio transmission signal is supplied. If an audio reception signal having a predetermined level or more is input, an output of the comparator 79 becomes low in level, the switch 74 is turned off, and the gain of the reception system is increased. The output of the comparator 79 increases the gain of the amplification rectifying circuit 77 by turning off a gain varying switch circuit 76 of the circuit 77 and is caused to have hysteresis characteristics to prevent the reception mode from being easily changed to the transmission mode.

An audio transmission signal input from the hand-free microphone 700 is supplied to an amplifier 80 through a terminal Tc. The signal is amplified to have a predetermined level and then supplied to a insertion loss changing circuit 81. Since the output of the comparator 79 is still low in level, the transmission signal is greatly damaged by the circuit 81 and attenuated to such a level that the bidirectional characteristics of conversation are not degraded. The transmission signal is supplied to the terminal T61 through an amplifier 82 and a switch 83, and transmitted to the terminal T62 of the portable radio telephone 200 through the contact-type connector 300.

The output of the amplifier 80 is partially supplied to an amplification rectifying circuit 78 as a transmission monitor signal. The signal is amplification-rectified and input to a minus terminal of the reception/transmission level comparator 79. Since the reception signal is lost, the signal supplied to the plus terminal of the comparator 79 is quickly decreased in level, and the output of,the comparator 79 is quickly inverted and becomes high in level. Since the switch 74 is thus turned on and the circuit 81 is turned off, the transmission signal is supplied to the terminal T61 at a normal level and transmitted to the terminal T62 of the portable radio telephone 200 through the contact-type connector 300.

The case will be described where a facsimile apparatus serving as a data terminal is used. At the event, the hand-free signal of the terminal T72 of the portable radio telephone 200 becomes low in level, and the speaker signal of the terminal T82 becomes low in level.

The speaker pass switch 72 is turned off by the low-level speaker signal of the terminal T81, and the data communicating switch 88 is turned on by the low-level hand-free signal of the terminal T72. Further, the transistor 85 is turned off and the transistor 84 is turned on by the low-level hand-free signal of the terminal T72. Furthermore, the switch 83 is turned off by turning off the transistor 85. A facsimile transmission signal input from the facsimile apparatus 600 through a terminal Tb is amplified by an amplifier 87 to have a predetermined level, supplied to the terminal T61 through the data communicating switch 88, and transmitted to the terminal T62 of the portable radio telephone 200 through the contact-type connector 300.

A facsimile reception signal is input to a terminal T91, amplified by the amplifier 71 to a predetermined level, and supplied to the facsimile apparatus 600 through a resistor 86 and terminal Tb.

Figure 6:
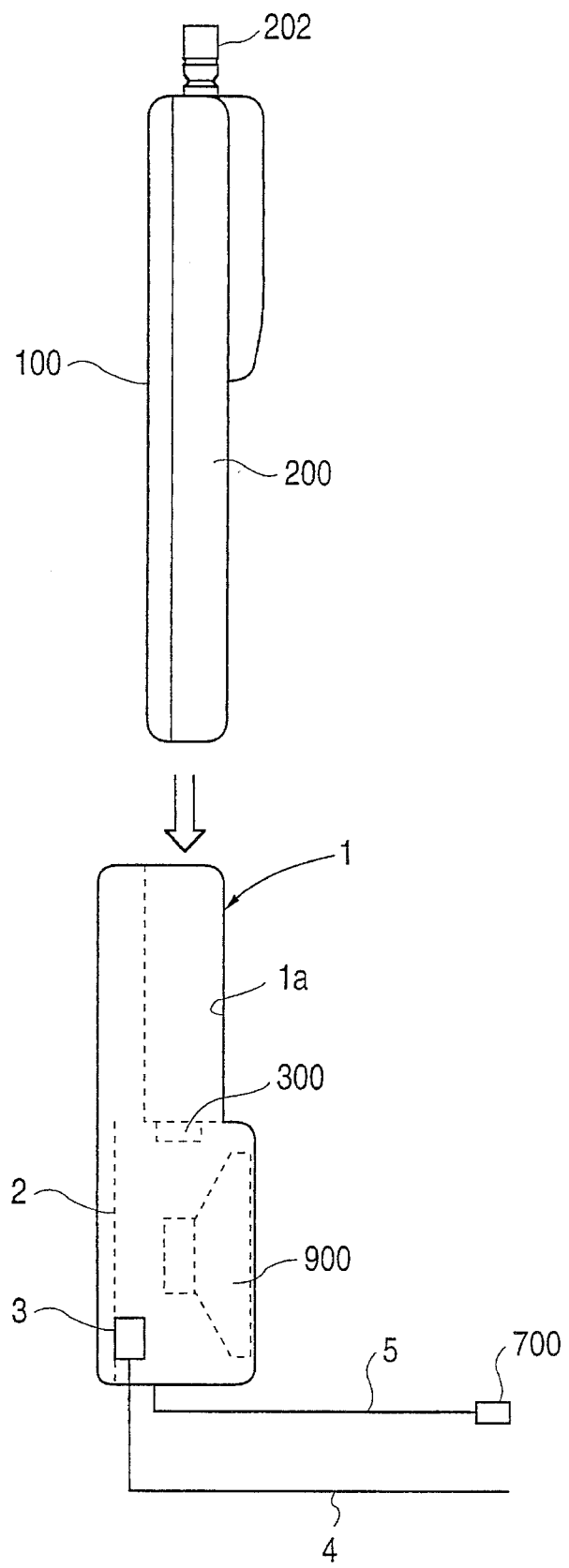
FIG. 6 shows the appearance of a radio telephone device to which the adapter according to the present invention is applied.

In the above embodiment, the speaker 900 is externally attached to the adapter 1. However, the speaker 900 may be included in the adapter 1. FIG. 6 shows the appearance of the adapter including the speaker.

The adapter 1 is provided with a circuit board 2 including the power supply section 10, power control circuit section 20, main power supply circuit section 30, sub-power supply circuit section 40, overcurrent detection/protection circuit section 50, and hand-free circuit section 70. The circuit board 2 is provided with a connector 3 connected to the facsimile apparatus 600 serving an a data terminal. The connector 3 corresponds to the terminal Ta shown in FIG. 1. The adapter 1 is connected to a car-mounted battery for applying a voltage of 13.7 V through a line 4 and to the hand-free microphone 700 through a line 5. A recessed portion la, into which the portable radio telephone 200 is mounted, is formed on the upper portion of the adapter 1. The contact-type connector 300 for connecting the circuit section of the adapter 1 to that of the portable radio telephone 200 is formed on the bottom portion of the hole la.

The battery pack 100 is mounted on the back portion of the portable radio telephone 200, and an extendible antenna 202 is attached to the top of the battery pack 100. When the portable radio telephone 200 is positioned in the recessed portion 1a of the adapter 1, the circuit sections of the portable radio telephone 200 and battery pack 100 are electrically connected to the circuit section of the adapter 1 through the contact-type connector 300.

Figure 7:
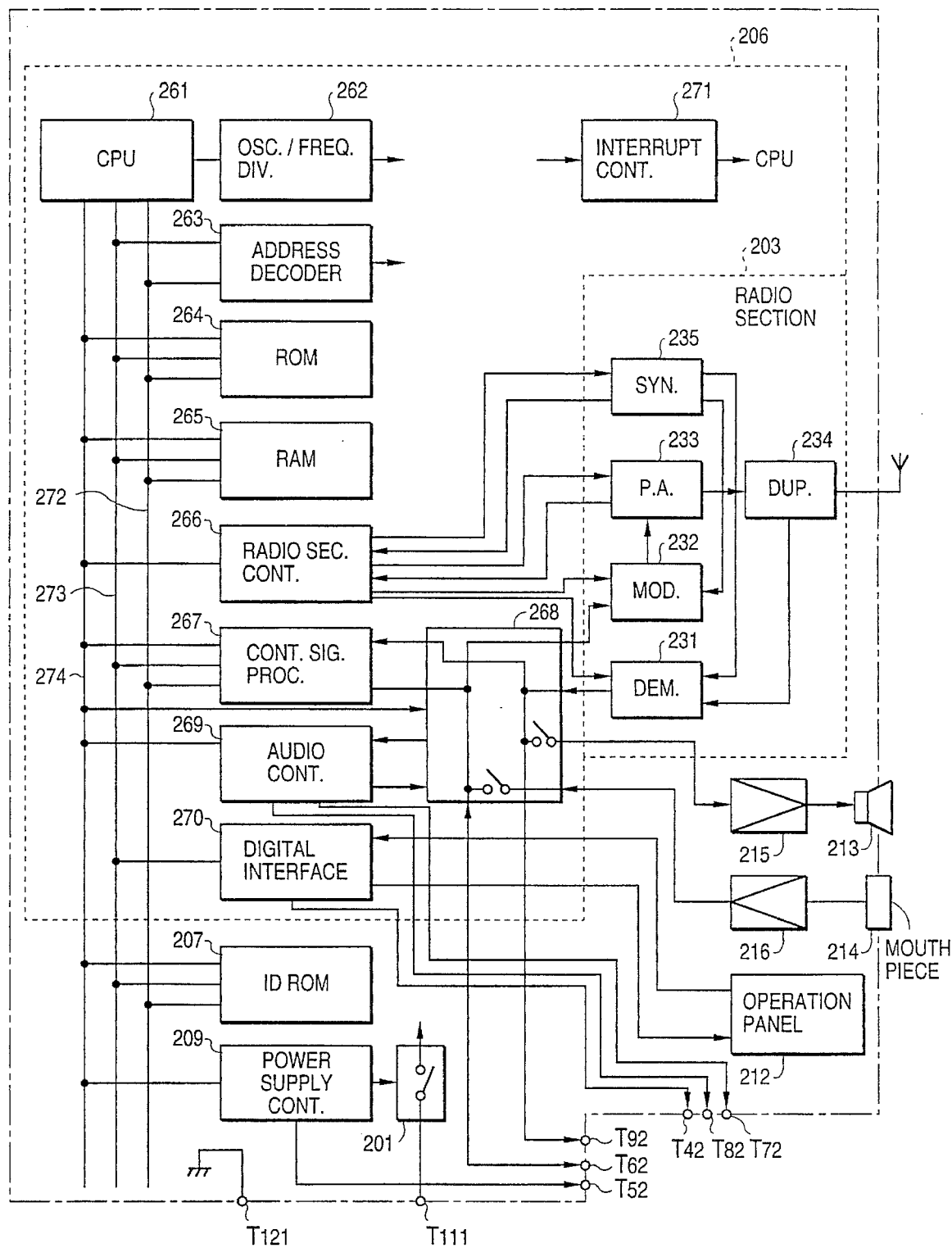
FIG. 7 is a block diagram showing in detail the portable radio telephone according to the embodiment shown in FIG. 1.

The portable radio telephone 200 will be described in detail. As shown in FIG. 7, a radio section 203 comprises a demodulator 231, a modulator 232, a power amplifier 233, a duplexer 234, and a synthesizer 235. The demodulator 231 demodulates a reception signal received from the base station through the antenna 202 and the duplexer 234. The reception signal contains control signals and an audio signal. The output of the demodulator 231 is supplied to a control signal processing section 267 through a switch circuit section 268, and also selectively supplied as audio reception signal to the hand-free circuit section 70 (shown in FIG. 7) of the adapter 1 through the terminal T92 or to an earpiece 213 of the portable radio telephone 200 through an amplifier 215 under control of the audio control section 269. The modulator 232 modulates control signals supplied from the control signal processing section 267 and audio signals selectively supplied from the hand-free circuit section 70 (shown in FIG. 1) of the adapter 1 through the terminal T62 or from a mouthpiece 214 of the portable radio telephone 200 through an amplifier 216. The power amplifier 233 amplifies a transmission signal output from the modulator 232. The duplexer 234 transmits a reception signal input through the antenna 202 to the demodulator 231, and transmits a transmission signal input through the modulator 232 and power amplifier 233 to the antenna 202. The synthesizer 235 is a channel selecting local generator used to designate the frequency to be demodulated by the demodulator 231 and the frequency to be modulated by the modulator 232.

An audio control section 206 comprises a CPU 261, and oscillator/frequency-divider 262, an address decoder 263, a ROM 264, a RAM 265, a radio section controlling section 266, a control signal processing section 267, a switch section 268, an audio control section 269, a digital interface 270, and an interrupt controller 271.

FIG. 7 also includes a power switch 201, an IDROM 207; a power supply control section 209; a data bus 274 having, e.g., 8 bits; an address bus 273, and a control bus 272.

The CPU 261 controls the whole of the audio control section 206. The oscillator/frequency-divider 262 supplies a clock to the CPU 261, frequency divides the clock, and supplies the frequency-divided clock to each section as a timing signal. The address decoder 263 outputs a predetermined operating signal from the CPU 261 to each section in response to an instruction signal. The ROM 264 stores various programs necessary for the operation of the CPU 261. The RAM 265 stores various types of data when the CPU 261 performs processing operations. The radio section controlling section 266 controls the radio section 203 in response to the instruction of the CPU 261. For example, the radio section controlling section 266 designates a frequency to be designated by the synthesizer 235, an amplification factor at which the power amplifier amplifies transmission signals, and a degree of modulation at which the modulator 232 modulates the transmission signals. The radio section controlling section 266 also receives an asynchronous signal output from the synthesizer 235 to prevent an erroneous operation and a detection signal output from the power amplifier 233 and then supplies these signals to the CPU 261.

The control signal processing section 267 performs bit synchronization and frame synchronization with the control signal output from the switch section 268, extracts control data included in the control signal received from the base station, and sends control data to the switch section 268 for transmission to the base station.

The audio control section 269 performs various types of controls of the audio paths. For example, the audio control section 269 controls the switch section 268 so that the signals output from the demodulator 231 are selectively applied to the the amplifier 215, and so that the output of the amplifier 216 is selectively coupled to the input of the modulator 232.

When a user wishes to connect a facsimile machine to the portable radio telephone in order to transmit image data, the user enters a predetermined command on the operation panel 212. The command is applied to the CPU 261 through the digital interface 270. Responsive to the command, the CPU 261 controls the audio control section 269 so that it generates a speaker signal. The speaker signal becomes high in level in a conversation mode for normal conversation and low in level in a data transmission mode for data communication such as facsimile communication.

When the user wishes to place a call in the hand-free operation mode, the user enters a predetermined command on the operation panel 212. The command is applied to the CPU 261 through the digital interface 270. Responsive to the command, the CPU 261 controls the audio control section 269 so that it generates a hand-free signal. The hand-free signal becomes high in level when the hand-free operation is selected and low in level when it is not selected. The speaker signal and hand-free signal are transmitted through the terminals T82 and T72, respectively.

The digital interface 270 forms an interface between the audio control section 206 and operation panel 212. The interrupt controller 271 interrupts the CPU 261 in response to an interrupt instruction from each section.

The digital interface 270 generates a calling/waiting signal which becomes high in level in the communication state and low in level in the waiting state and outputs the calling/waiting signal to the terminal T42.

The power supply control section 209 generates a power-on signal which becomes high in level when the power switch is turned on and low in level when it is turned off, and supplies the power-on signal to the terminal T52.

In the embodiment described above, the communication state of the portable radio telephone may be defined as a state wherein the portable radio telephone has established a radio link for speech communication. In such a state state, a user may have a conversation with another party over the radio link. The communication state of the portable radio telephone may be defined as a state wherein a transmitter section, such as the power amplifier 233 of the portable radio telephone, is powered for transmission of signals.

As described above, according to the present invention, the portable radio telephone is detachably connected to the adapter through the connector connectable to at least the power line. When the portable radio telephone is not in the conversation mode and is connected to the adapter through the connector, the first power supply circuit is turned on only enough to charge the chargeable battery of the portable radio telephone. Both the first power supply circuit and the second power supply circuit are turned on to provide enough power for operations of the portable radio telephone in the communication state. Since, therefore, a curl cord for connecting the adapter and portable radio telephone is not needed, useless current flows from a power supply, such as a car-mounted battery for supplying power to the adapter, can be avoided, and a waste of the power supply can be prevented.

Although an embodiment applied to a cellular radio telephone has been described, it will be apparent to those skilled in the art that the present invention may be easily applied to any kind of radio communication apparatus, for example, a cordless telephone and so on.

While the foregoing description is directed to presently preferred embodiments, it will be apparent to those of ordinary skill that various modifications may be made without departing from the true spirit or scope of the invention which is to be limited only by the appended claims.

We claim:

1. An adapter unit for use with a portable radio unit having a rechargeable battery, the portable radio being connectable to the adapter unit, the adapter unit comprising:

detecting means for detecting a coupling of the portable radio unit to the adapter unit and an operational state of the portable radio unit, the detecting means further detecting whether the portable radio unit is being powered by the rechargeable battery;

a hand-free circuit for coupling the portable radio unit to a speaker and a microphone;

first power supply means for charging the rechargeable battery with electric power in the event that the detecting means detects that the portable radio unit is connected to the adapter unit and that the portable radio unit is not being powered by the rechargeable battery;

second power supply means for supplying the portable radio unit with electric power by the rechargeable battery in the event that the detecting means detects that the portable radio unit is attached to the adapter unit, that the portable radio unit is in a communication state and that the portable radio unit is being powered by the rechargeable battery, the power supply capacity of the second power supply means being larger than that of the first power supply means; and third power supply means for supplying the hand-free circuit with electric power in the event that the detecting means detects that the portable radio unit is coupled to the adapter unit and that the portable radio unit is powered by the rechargeable battery.

2. The adapter unit of claim 1, wherein the second power supply means supplies the portable radio unit with electric power through the rechargeable battery.

3. The adapter unit of claim 1, further comprising a power supply terminal connected to both of the first power supply means and the second power supply means for supplying the portable radio unit or the rechargeable battery with electric power.

4. The adapter unit of claim 1, wherein said hand-free circuit controls the level of signals output from the speaker in response to the level of signals input to the microphone.

5. The adapter unit of claim 4, wherein said third power supply means supplies electrical power to said hand-free circuit in response to a connection between the adapter unit and the portable radio unit when the portable radio unit is in the communication state.

6. The adapter unit of claim 5, wherein said third power supply means does not supply electrical power to said hand-free circuit in response to a connection between the adapter unit and the portable radio unit when the portable radio unit is not in the communication state.

7. The adapter unit according to claim 1, wherein:

said first power supply means charges the rechargeable battery with electric power in the event that the portable radio unit is connected to the adapter unit when said detecting means detects that the portable radio unit is not being powered.

8. The adapter unit according to claim 1, wherein said first power supply means comprises a first constant current source and said second power supply means comprises a second constant current source.

9. The adapter unit according to claim 1, further comprising an overcurrent detection circuit for detecting an abnormal charging current supplied to the rechargeable battery and for inhibiting said second power supply means responsive to the detection of the abnormal charging current.

10. An adapter unit used with a portable radio unit having a rechargeable battery, the portable radio unit being connectable to the adapter unit, the adapter unit comprising:

detecting means for detecting a coupling of the portable radio unit to the adapter unit, and an operational state of the portable radio unit, the detecting means further detecting whether the portable radio unit is being powered by the rechargeable battery;

a hand-free circuit for coupling the portable radio unit to a speaker and a microphone;

first power supply means for charging the rechargeable battery with electric power in the event that the detecting means detects that the portable radio unit is connected to the adapter unit and that the portable radio is not in a communication state;

second power supply means for supplying the portable radio unit with electric power in the event that said detecting means detects that the portable radio unit is in the communication state, the power supply capacity of the second power supply means being larger than that of the first power supply means; and third power supply means for supplying the hand-free circuit with electric power in the event that the detecting means detects that the portable radio unit is coupled to the adapter unit and that the portable radio is being powered by the rechargeable battery.

11. The adapter unit of claim 10, wherein the second power supply means supplies the portable radio unit with electric power through the rechargeable battery.

12. The adapter unit of claim 10, further comprising a power supply terminal connected to both of the first power supply means and the second power supply means for supplying the portable radio unit or the rechargeable battery with electric power.

13. The adapter unit of claim 10, wherein said hand-free circuit controls the level of signals input to the microphone.

14. The adapter unit of claim 13, wherein said third power supply means supplies electrical power to said hand-free circuit in response to a connection between the adapter unit and the portable radio unit when the portable radio unit is in the communication state.

15. The adapter unit of claim 14, wherein said third power supply means does not supply electrical power to said hand-free circuit in response to a connection between the adapter unit and the portable radio unit when the portable radio unit is not in the communication state.

16. The adapter unit according to claim 10, wherein:

said first power supply means charges the rechargeable battery with electric power in the event that the portable radio unit is attached to the adapter unit when said detecting means detects that the portable radio is not being powered.

17. The adapter unit according to claim 10, wherein said first power supply means comprises a first constant current source and said second power supply means comprises a second constant current source.

18. The adapter unit according to claim 10, further comprising an overcurrent detection circuit for detecting an abnormal charging current supplied to the rechargeable battery and for inhibiting said second power supply means responsive to the detection of the abnormal charging current.

* * * * *